US008266578B2

(12) United States Patent
Bazigos et al.

(10) Patent No.: US 8,266,578 B2
(45) Date of Patent: Sep. 11, 2012

(54) VIRTUAL VALIDATION OF SOFTWARE SYSTEMS

(75) Inventors: Angela Bazigos, San Carlos, CA (US); Richard Lumkin, San Ramon, CA (US)

(73) Assignees: Angela Bazigos, San Carlos, CA (US); Christopher Hanson, Alameda, CA (US)

( * ) Notice: Subject to any disclaimer, the term of this patent is extended or adjusted under 35 U.S.C. 154(b) by 1176 days.

(21) Appl. No.: 12/008,297

(22) Filed: Jan. 9, 2008

(65) Prior Publication Data

US 2008/0178144 A1    Jul. 24, 2008

Related U.S. Application Data

(60) Provisional application No. 60/879,742, filed on Jan. 10, 2007.

(51) Int. Cl.
*G06F 9/44* (2006.01)
*G06F 15/177* (2006.01)

(52) U.S. Cl. ........ 717/101; 717/102; 717/103; 717/120; 717/122; 717/123; 709/221; 709/222

(58) Field of Classification Search .................... None
See application file for complete search history.

(56) References Cited

U.S. PATENT DOCUMENTS

| | | | | |
|---|---|---|---|---|
| 6,405,364 B1* | 6/2002 | Bowman-Amuah | .......... | 717/102 |
| 6,550,057 B1* | 4/2003 | Bowman-Amuah | .......... | 717/101 |
| 6,601,233 B1* | 7/2003 | Underwood | .................. | 717/101 |
| 6,691,070 B1* | 2/2004 | Williams et al. | ............... | 702/188 |
| 6,718,535 B1* | 4/2004 | Underwood | .................. | 717/101 |
| 7,353,262 B2* | 4/2008 | Styles et al. | .................. | 709/222 |
| 7,430,498 B2* | 9/2008 | Butterfield et al. | ........... | 717/101 |
| 7,752,606 B2* | 7/2010 | Savage | .......................... | 717/135 |
| 7,788,632 B2* | 8/2010 | Kuester et al. | ................ | 717/100 |
| 7,793,285 B2* | 9/2010 | Hattori et al. | .................. | 717/174 |
| 7,810,092 B1* | 10/2010 | van Rietschote et al. | ......... | 718/1 |
| 8,126,760 B2* | 2/2012 | Kelly et al. | .................... | 717/102 |
| 2002/0026630 A1* | 2/2002 | Schmidt et al. | ............... | 717/103 |
| 2003/0200288 A1* | 10/2003 | Thiyagarajan et al. | ........ | 709/221 |
| 2004/0073890 A1* | 4/2004 | Johnson et al. | ................ | 717/120 |
| 2004/0098472 A1* | 5/2004 | Styles et al. | .................. | 709/221 |
| 2004/0117759 A1* | 6/2004 | Rippert et al. | ................ | 717/103 |
| 2004/0261060 A1* | 12/2004 | Haselden et al. | ............. | 717/120 |
| 2005/0251278 A1* | 11/2005 | Popp | ............................. | 700/110 |

(Continued)

OTHER PUBLICATIONS

J.S.Y. Chin et al., Virtual Appliances for Pervasive Computing: A Deconstructionist, Ontology Based, Programming-By-Example approach, Jun. 2005, [Retrieved on Apr. 17, 2012]. Retrieved from the internet: <URL: http://cswww.essex.ac.uk/Research/iieg/papers/Jeannette%20IE05.pdf> 9 Pages (1-9).*

(Continued)

*Primary Examiner* — Don Wong
*Assistant Examiner* — Anibal Rivera
(74) *Attorney, Agent, or Firm* — Wilson Sonsini Goodrich & Rosati

(57) ABSTRACT

A method for building and verifying and validating a software system that is used for regulated industry software related activities, such as FDA trials, field trials, biomedical data gathering, and similar efforts includes building the application into a virtual appliance using, for example, Vmware. The application and the supporting software are encapsulated in a single virtual file to create a virtual appliance that is independent of hardware and dependent only on virtual appliance support.

18 Claims, 3 Drawing Sheets

U.S. PATENT DOCUMENTS

| | | | |
|---|---|---|---|
| 2006/0059455 A1* | 3/2006 | Roth et al. | 717/103 |
| 2007/0256069 A1* | 11/2007 | Blackman et al. | 717/122 |
| 2007/0294676 A1* | 12/2007 | Mellor et al. | 717/139 |
| 2008/0178143 A1* | 7/2008 | Dougan et al. | 717/100 |
| 2009/0100423 A1* | 4/2009 | Doyle et al. | 718/1 |

OTHER PUBLICATIONS

David A. Vogel et al., Ideas for Validating Production Software, Sep. 2005. [Retreived on Apr. 17, 2012]. Retreived from the internet <URL http://www.inea.com/PDF/Ideas_for_Validating_Production_Software.pdf> 7 pages (1-7).*

*General Principles of Software Validation; Final Guidance for Industry and FDA Staff, Version 2.0*, Jan. 11, 2002, 47 pages, US Dept. of Health & Human Services, FDA, Center for Devices & Radiological Health, Center for Biologics Evaluation & Research.

* cited by examiner

VIRTUAL VALIDATION OF SOFTWARE SYSTEMS

CROSS-REFERENCE TO RELATED APPLICATIONS

This application claims the benefit of the priority filing date of Provisional Application 60/879,742, filed Jan. 10, 2007.

FEDERALLY SPONSORED RESEARCH

Not applicable.

SEQUENCE LISTING, ETC ON CD

Not applicable.

BACKGROUND OF THE INVENTION

1. Field of the Invention

This invention relates to software systems for managing data and documentation for projects in regulated industries such as the pharmaceutical and biomedical fields, biomedical data gathering and the like and, more particularly, relates to the verification and validation requirements for such software systems.

2. Description of Related Art

Software systems that are designed to manage data and documentation for projects that require regulatory review and approval must be certified as accurate and reliable, so that the regulatory examiners can be assured that the data is sound and the requested regulatory action is factually justified. An example of this is the software systems used to manage and control studies and trials for biomedical purposes, such as US FDA drug or new device trials. The software system must be validated under an approval process that is described below.

Software verification provides objective evidence that the design outputs of a particular phase of the software development life cycle meet all of the specified requirements for that phase. Software verification looks for consistency, completeness, and correctness of the software and its supporting documentation, as it is being developed, and provides support for a subsequent conclusion that software is validated. Software testing is one of many verification activities intended to confirm that software development output meets its input requirements. Other verification activities include various static and dynamic analyses, code and document inspections, walkthroughs, and other techniques.

Software validation is the process of building quality into a software system to ensure the reliability of software applications and integrity of electronic records that resides in the application. Software validation is a part of the design validation for a finished application, but is not separately defined in the Quality System regulation. For purposes of this guidance, FDA considers software validation to be "confirmation by examination and provision of objective evidence that software specifications conform to user needs and intended uses, and that the particular requirements implemented through software can be consistently fulfilled." In practice, software validation activities may occur both during, as well as at the end of the software development life cycle to ensure that all requirements have been fulfilled. Since software is usually part of a larger hardware system, the validation of software typically includes evidence that all software requirements have been implemented correctly and completely and are traceable to system requirements. A conclusion that software is validated is highly dependent upon comprehensive software testing, inspections, analyses, and other verification tasks performed at each stage of the software development life cycle. Testing of device software functionality in a simulated use environment, and user site testing are typically included as components of an overall design validation program for a software automated device. For the purposes of this document, the terms validation and verification are used interchangeably.

Current Validation Process for Software Systems

1. Software COTS Applications are developed and tested by the vendor using SDLC in the vendor's standard development environment (of servers, database, operating systems for each piece of hardware, ancillary software, etc.).

2. Different sponsors use different environments; e.g., different versions of Oracle v9i, v10, or different operating systems; e.g., Solaris, Linux, Windows 2000, Windows XP, so the vendor will then test the same application in the sponsor environments that the vendor supports—typically the vendor will support versions of the last 2-3 years and then will drop support. This means the application is tested as a system.

3. The vendor will then sell the application (NOT the system) to the sponsor.

4. Before purchasing the application the sponsor may choose to audit the vendor to ensure that good software engineering practices have been used for the development of the application.

5. The sponsor will then deploy the application based on the sponsor's environment, by assembling/installing the other components, such as hardware, database, ancillary software, etc, to create the computer system and then test the system in the sponsor environment, and by configuring the application by entering the values for the pre-populated lists of the application; e.g., species, race, gender, sample type (blood, urine, etc.) location, etc. Several steps are involved in this as the hardware, software and ancillary software comes from different vendors, such as Oracle, MS, Sun, HP, and the application vendor. The process of ensuring that the application functions correctly in the sponsor environment and meets the sponsor requirements is the practical implementation of the validation process.

6. Validation at the sponsor site can take between 6 months to 2 years or more (elapsed—not person-time) for a new application, incurring significant validation costs rates that range from tens of thousands to hundreds of thousands to millions of dollars per month.

7. Upgrade and revalidation of the system is required by the sponsor as the vendors of different system components stop supporting older versions of some of the components. Upgrade and revalidation at the sponsor site can take many months.

8. A typical pharmaceutical/biomedical company may have 30-40 applications that require validation/revalidation.

BRIEF SUMMARY OF THE INVENTION

The present invention generally comprises a new method for building and verifying and validating a software system that is used for regulated industry software related activities, such as FDA trials, field trials, biomedical data gathering, and similar efforts.

A major aspect of the invention is that the vendor builds the application into a virtual appliance using virtualization technology. Thus instead of installing the required software components to support the application on different hardware systems, the application and the supporting software are encapsulated in a single virtual appliance that is independent of hardware and dependent only on virtualization technology;

e.g. VMware. Virtualization is something that the industry is moving towards as virtualization technologies are being used to reduce the proliferation of hardware. The application specific virtual appliance then is sold to the sponsor.

This approach to constructing a complex software system drastically reduces the time and effort required for assembly of the application into a system and subsequent testing of the assembled system at the sponsor site, from several months or more to a few weeks. It also reduces the need for the vendor to test and support the application on several environments. Thus the lengthy validation process that is required after system build is greatly streamlined and shortened.

A further advantage to the invention is that also reduces the proliferation of hardware at both the vendor and the sponsor site. A virtual appliance may be operated on many different systems using many different operating system software applications. The adaptability of the virtual appliance to different hardware configurations and operating systems is a major benefit to validation at both the local and global levels.

In constructing a software system there are two types of configurations. The hardware and hardware related configuration, which formerly required a system build of all relevant hardware components and the operating software, can be now be done within the invention as part of building the virtual appliance. Thus a great amount of resources are saved in not building a new hardware/software system.

DETAILED DESCRIPTION OF THE INVENTION

Figure 1:
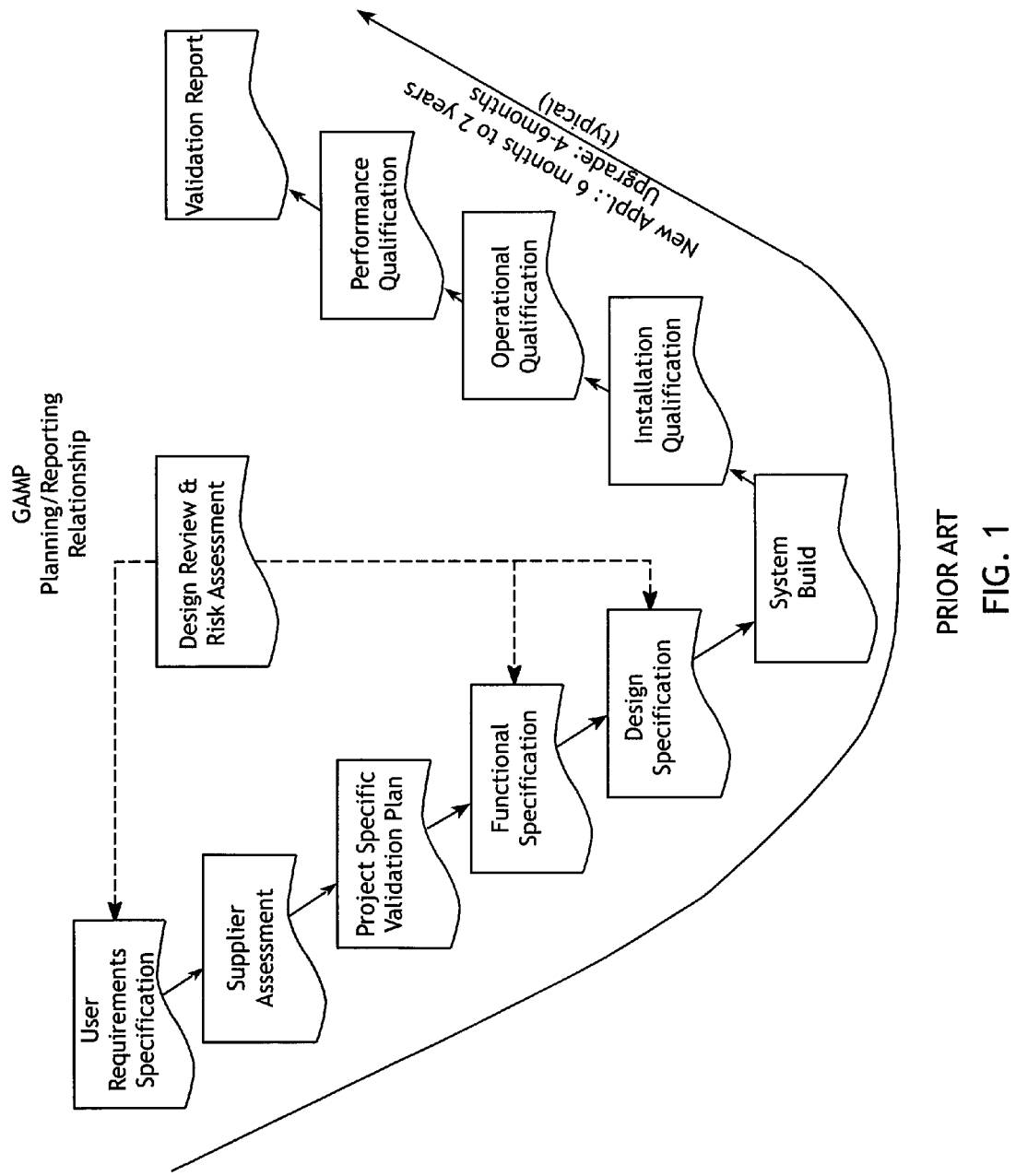
FIG. 1 is a flow chart depicting the typical steps in the prior art required to construct and validate a software system according to Good Automated Manufacturing Practices (GAMP).

The present invention generally comprises a new method for building and verifying and validating a software system that is used for regulated industry software related activities and research projects, such as FDA trials, field trials, biomedical data gathering, and similar efforts.

DEFINITIONS OF TERMS USED IN THIS APPLICATION

Electronic record: Any combination of text, graphics, data, audio, pictorial or other information representation in digital form that is created, modified, maintained, archived, retrieved or distributed by a computer system (21CFR 11.3)

SDLC: Software Development Life Cycle: the process through which a software application is developed in a computer environment. Software validation takes place within the environment of an established software life cycle. The software life cycle contains software engineering tasks and documentation necessary to support the software validation effort. In addition, the software life cycle contains specific verification and validation tasks that are appropriate for the intended use of the software. SDLCs should be selected and used for a software development project.

Server: A piece of hardware that performs a specific function in the overall system; e.g., a database server, installed with database software, a web server installed with web executing software, a file server, or the like. Before any software can be installed on a server the operating system and ancillary software need to be installed. Servers are accessed by the user via a client or another server or a terminal usually used for server management purposes.

Ancillary software: Additional software that needs to be installed on a server or client; e.g., antivirus software such as Symantec, backup software such as Veritas to support the application.

Client: the designation for the piece of hardware through which the user of the system interacts with the system.

User: the person(s) who use the computer system.

Requirements: can be any need or expectation for a system or for its software. Requirements reflect the stated or implied needs of the customer, and may be market-based, contractual, or statutory, as well as an organization's internal requirements. There can be many different kinds of requirements (design, functional, implementational, interface, performance, or physical (size, power consumption, memory usage, etc.). Software requirements are typically derived from the system requirements for those aspects of system functionality that have been allocated to software. Software requirements are typically stated in functional terms and are defined, refined, and updated as a project progresses. Success in accurately and completely documenting software requirements is a crucial factor in successful validation of the resulting software.

Design: How the software requirements specification is translated into a logical and physical representation of the software to be implemented. The software design specification is a description of what the software should do and how it should do it. Due to complexity of the project or to enable persons with varying levels of technical responsibilities to clearly understand design information, the design spec. may contain both a high level summary of the design and detailed design information. The completed software design specification constrains the programmer/coder to stay within the intent of the agreed upon requirements and design. A complete software design spec will relieve the programmer from the need to make ad hoc design decisions. The software design needs to address human factors. Use error caused by designs that are either overly complex or contrary to users' intuitive expectations for operation is one of the most persistent and critical problems encountered by FDA. Frequently, the design of the software is a factor in such use errors. Human factors engineering should be woven into the entire design and development process, including the device design requirements, analyses, and tests. Device safety and usability issues should be considered when developing flowcharts, state diagrams, prototyping tools, and test plans. Also, task and function analyses, risk analyses, prototype test and reviews, and full usability tests should be performed. Participants from the user population should be included when applying these methodologies.

IQ/OQ/PQ: For many years, both FDA and regulated industry have attempted to understand and define software validation within the context of process validation terminology. For example, industry documents and other FDA validation guidance sometimes describe user site software validation in terms of installation qualification (IQ), operational qualification (OQ), and performance qualification (PQ). Definitions of these terms and additional information regarding IQ/OQ/PQ may be found in Guideline on General Principles of Process Validation, from US FDA, dated, May 11, 1987 and other FDA publications and documents currently available.

User Site Sponsor's company site.

GAMP: Good Automated Manufacturing Practices, and industry standard.

GMP: Good Manufacturing Practices, and industry standard.

GCP: Good Clinical Practices, an industry standard.

GLP: Good Laboratory Practices, and industry standard.

GxP: reference to GLP, GCP, GMP combined as a group.

Software application: the specific application sold by a software vendor. This application needs to be installed in the sponsor environment. Examples are LIMS but also Excel, Word, etc.

LIMS: Laboratory Information Management System.

Vendor: The company that sells software or hardware; e.g., Microsoft, Sun, HP, Thermo, Pharsight, Applied Biosystems, etc.

Sponsor: The company (pharmaceutical, biotech, or the like) that submits records to the regulatory agency (FDA or the like).

Hardware: computer hardware; e.g., servers desktop, laptop, printers, etc; or instrument hardware such as sensors, tumor measurement devices, etc.

Software: One or more computer programs that are assembled to form a computer application and are sold either as a single application or a collection of application modules.

Virtual technology: software that acts as or emulates hardware; e.g., Vmware or Microsoft virtual technology or the like.

Computer system: the collection of the computer application and the associated hardware and software that are required for the running of the application; e.g., Excel needs a PC plus a windows or Mac operating system to run. A system will typically require a client and one or more servers as well as hardware peripherals such as printers and networking.

Environment: the collection of hardware and related software on which an application is supported.

COTS: Commercial Off The Shelf; i.e., an application that has been pre-developed by a vendor and then used by the sponsor, such as Excel, LIMS, etc.

Custom Application or Custom System: applications that are developed in-house whether at the vendor or at the sponsors site. Also known as bespoke system.

Virtual Machine/Virtual Appliance: application pre-packaged as a system in virtual technology.

Operating System Program that runs other programs, such as Windows, Linux, x86, Solaris, these operating systems are hardware dependent and different hardware vendors use different operating systems.

Database: program that stores data, such as Oracle, RDB, Sybase, etc.

Figure 2:
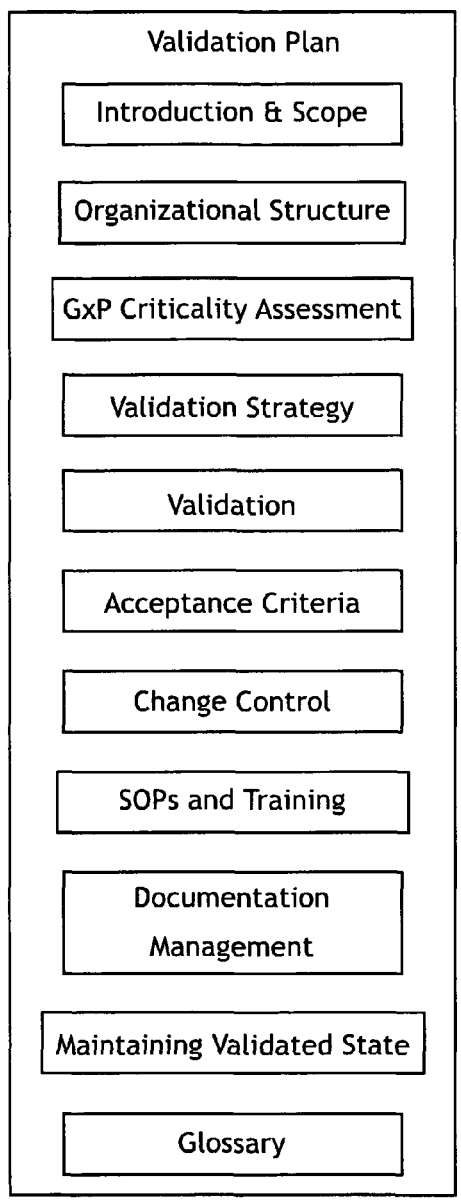
FIG. 2 is a chart depicting the required components of a software validation plan in the prior art under GAMP.

With regard to FIG. 1, a typical process for creating a complex software system uses the GAMP methodology as shown. The initial user requirements specification is a very important key to ultimate software validation, in that it defines the intended use of the software and the extent to which the device manufacturer is dependent on that software for operation of a quality medical device. Then, a supplier assessment is carried out to determine the availability of hardware and software. A project specific validation plan is then written, and it is generally required to embody the sections depicted in FIG. 2. The validation must be conducted in accordance with this documented protocol, and the validation results must also be documented. Test cases should be documented that will exercise the system to challenge its performance against the pre-determined criteria, especially for its most critical parameters. Test cases should address error and alarm conditions, startup, shutdown, all applicable user functions and operator controls, potential operator errors, maximum and minimum ranges of allowed values, and stress conditions applicable to the intended use of the equipment.

A functional specification is then created, leading to a design specification that details the hardware and software components. After all these steps are carried out, the system is built as designed. During the steps leading to system build, a design review and risk assessment process is carried out in parallel and used to modify the user specification, functional specification, and design specification.

After the system is built it must be verified and validated. This testing is typically described as installation qualification, operational qualification, and performance qualification. Testing at the user site is an essential part of software validation. Quality system regulations require installation and inspection procedures (including testing where appropriate) as well as documentation of inspection and testing to demonstrate proper installation. Terms such as beta test, site validation, user acceptance test, installation verification, and installation testing have all been used to describe user site testing. For purposes herein, the term "user site testing" encompasses all of these and any other testing that takes place outside of the developer's controlled environment. This testing should take place at a user's site with the actual hardware and software that will be part of the installed system configuration. The testing is accomplished through either actual or simulated use of the software being tested within the context in which it is intended to function. However, in some areas (e.g., blood establishment systems) there may be specific site validation issues that need to be considered in the planning of user site testing. Test planners are advised to check with the FDA Center(s) with the corresponding product jurisdiction to determine whether there are any additional regulatory requirements for user site testing. User site testing should follow the pre-defined written plan with a formal summary of testing and a record of formal acceptance.

Documented evidence of all testing procedures, test input data, and test results should be retained. There should be evidence that hardware and software are installed and configured as specified. Measures should ensure that all system components are exercised during the testing and that the versions of these components are those specified. The testing plan should specify testing throughout the full range of operating conditions and should specify continuation for a sufficient time to allow the system to encounter a wide spectrum of conditions and events in an effort to detect any latent faults that are not apparent during more normal activities. Some of the evaluations that have been performed earlier by the software developer at the developer's site should be repeated at the site of actual use. These may include tests for a high volume of data, heavy loads or stresses, security, fault testing (avoidance, detection, tolerance, and recovery), error messages, and implementation of safety requirements. The developer may be able to furnish the user with some of the test data sets to be used for this purpose. In addition to an evaluation of the system's ability to properly perform its intended functions, there should be an evaluation of the ability of the users of the system to understand and correctly interface with it. Operators should be able to perform the intended functions and respond in an appropriate and timely manner to all alarms, warnings, and error messages.

Figure 3:
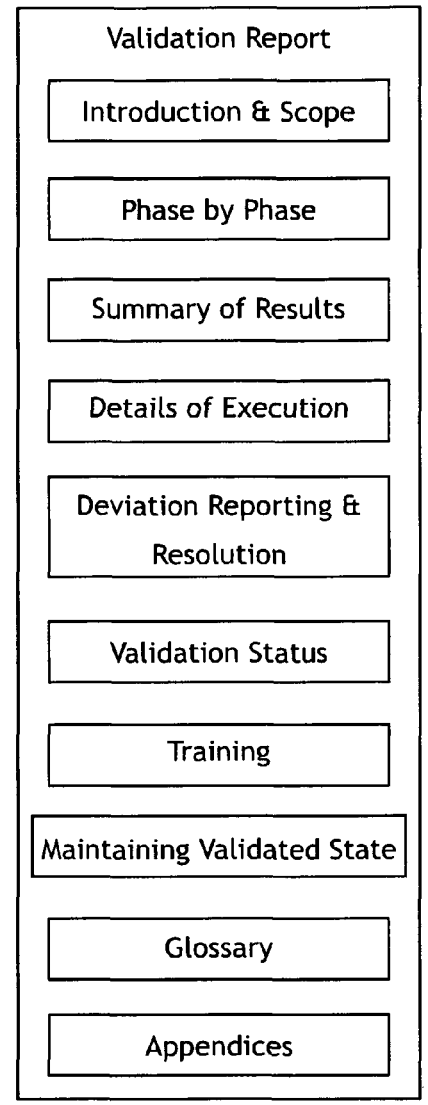
FIG. 3 is a chart depicting the required components of a software validation report in the prior art under GAMP.

The testing phase is arduous, and may require 6 months to 2 years to complete. The culmination of the testing phase is the validation report, which is generally required to embody the sections depicted in FIG. 3. It is clear from this summary of the testing process that it is arduous and lengthy and therefore costly. Even an upgrade to an existing system may require many months to complete validation testing.

Figure 4:
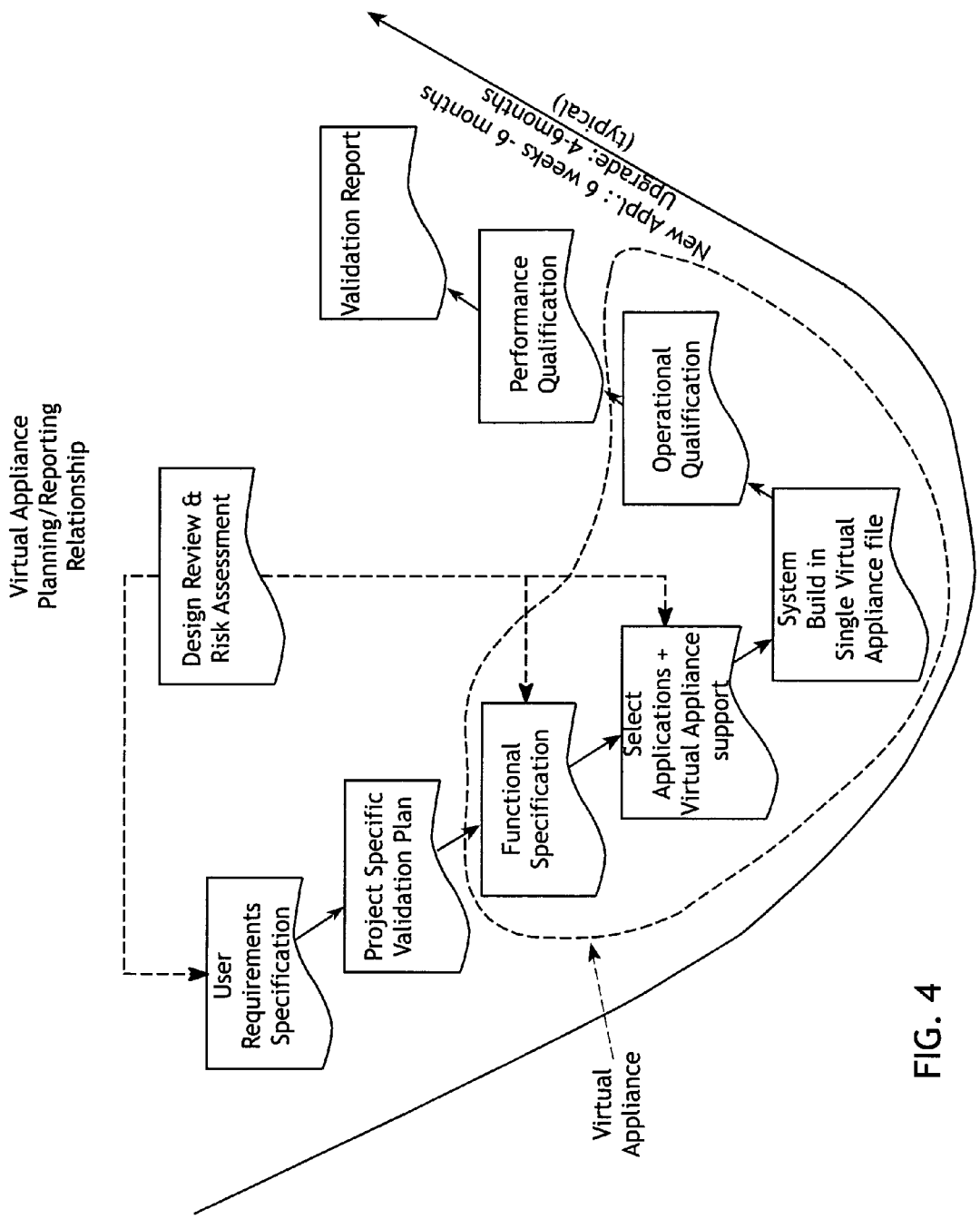
FIG. 4 is a flow chart depicting the steps required to construct and validate a software system in accordance with the present invention.

The present invention significantly shortens the time required to design the software/hardware system and test the system to completion. With regard to FIG. 4, the design begins as before with a user requirement specification, and from that a project specific validation plan is created. A functional specification is then written. In the next step, however, the former design specification is eliminated in favor of the step of selecting the required applications that fulfill the requirements of the functional specification, and selecting the appropriate virtual appliance support applications. The software applications may be COTS applications or custom software, and the virtual appliance support may also be drawn from existing software. Following this step, the "system build" step is carried out, and this involves combining the selected applications and the virtual appliance support software to generate a single virtual appliance.

It is significant to note that the system build step is fundamentally independent of the computer system of the sponsor. In this regard alone, the use of the virtual appliance approach saves a great amount of time and cost in building the system. It is only necessary to determine that the virtual appliance can be run under the system software of the computer system of the sponsor.

Following the system build step, the software system that is embodied in the virtual appliance must undergo verification and validation. The initial verification step of installation qualification in the prior art is rendered moot by the fact that the virtual appliance is capable of running on the sponsor's computer system. Thus a major qualification step is obviated, resulting in further savings of time and cost. The next verification steps involve operational qualification and performance qualification, leading to the final validation report. Regulatory agencies such as the US FDA have clarified that "For some off-the-shelf software development tools, such as software compilers, linkers, editors, and operating systems, exhaustive black-box testing by the device manufacturer may be impractical. Without such testing—a key element of the validation effort—it may not be possible to validate these software tools. However, their proper operation may be satisfactorily inferred by other means. For example, compilers are frequently certified by independent third-party testing, and commercial software products may have "bug lists", system requirements and other operational information available from the vendor that can be compared to the device manufacturer's intended use to help focus the "black-box" testing effort."

Thus it appears evident that previously developed knowledge of the software components in the virtual appliance may be used at least in part to verify the software system, resulting in great savings in the qualification process. This factor also reduces the need for the vendor to test and support the application on several environments. As a side effect it also reduces the proliferation of hardware at both the vendor and the sponsor site.

In addition, the task of application configuration, which consists of entering values for pre-populated lists can be carried out by an automated method, such as importing the desired values from a database program such as Excel, with attached validated programs that the application uses to populate the database based on user-generated scripts.

The result of the time and cost savings of the various steps of the invention is a significant improvement in the movement of a software system from the system build step to the validation report: often in the range of 6 weeks to 6 months for validation, rather than the 6 months to 2 years required in the prior art GAMP approach. Furthermore, the amount of time a vendor must spend to support multiple environments is greatly reduced, due to the fact that the virtual appliance is constructed to operate on primary system software that is typically found in the sponsor environments.

The foregoing description of the preferred embodiments of the invention has been presented for purposes of illustration and description. It is not intended to be exhaustive or to limit the invention to the precise form disclosed, and many modifications and variations are possible in light of the above teaching without deviating from the spirit and the scope of the invention. The embodiment described is selected to best explain the principles of the invention and its practical application to thereby enable others skilled in the art to best utilize the invention in various embodiments and with various modifications as suited to the particular purpose contemplated. It is intended that the scope of the invention be defined by the claims appended hereto.

The invention claimed is:

1. A method for constructing and validating a software system for a data intensive activity, including the steps of:
    creating a user requirements specification for a first software system;
    developing a project specific validation plan for the first software system based on the user requirements specification;
    developing a functional specification based on the user requirements specification;
    selecting first set of software applications to carry out the functional specification and selecting virtual appliance support software to run the selected software applications;
    building the first software system by combining said software applications and said virtual appliance support software to form a virtual appliance; and
    validating said first software system by validating said virtual appliance;
    wherein the validating said software system by validating said virtual appliance comprises confirmation by examination and provision of objective evidence that the user requirements specification conforms to user needs and intended uses, and that requirements implemented by the software can be consistently fulfilled;
    creating a second user requirements specification for a second software system;
    developing a second project specific validation plan for the second software system based on the second user requirements specification;
    selecting a second set of software applications including the first set of software applications including the validated virtual appliance;
    building the second software system by combining said second set of software applications including the validated virtual appliance; and
    validating said second software system by validating said second set of software applications including the validated virtual appliance, using previously developed knowledge of components of first set of software applications in the validated virtual appliance.

2. The method for constructing and validating a software system of claim 1, wherein said first software system is designed to operate under known operating system software, and said validating step includes verification of the virtual appliance under the known operating system software.

3. The method for constructing and validating a software system of claim 2, further including the step of entry of values for pre-populated lists through the use of automated software means.

4. The method for constructing and validating a software system of claim 2, further including the step of bypassing installation validation of the first software system through the use of validated virtual appliance installation in the known operating system software.

5. The method for constructing and validating a software system of claim 2, further including the step of validating at least one component of the software system through inferred qualification based on previously developed data regarding said at least one software component when operated within the virtual appliance.

6. The method for constructing and validating a software system of claim 2, further including the step of operating the software system in a plurality of computer environments using the known operating system software.

7. The method for constructing and validating a software system of claim 2, wherein said virtual appliance is independent of hardware and dependent only on virtual appliance support for operating under the known operating system software.

8. The method for constructing and validating a software system of claim 3, wherein said automated software means includes importing values from a database management program.

9. A method for constructing and validating a software system for a data intensive activity, including the steps of:
creating a user requirements specification for a first software system;
developing a project specific validation plan for the first software system based on the user requirements specification;
developing a functional specification based on the user requirements specification;
selecting first set of software applications to carry out the functional specification and selecting virtual machine support software to run the selected software applications;
building the first software system by combining said software applications and said virtual appliance support software to form a virtual appliance; and
validating said software system by validating said virtual appliance;
creating a second user requirements specification for a second software system;
developing a second project specific validation plan for the second software system based on the second user requirements specification;
selecting a second set of software applications including the first set of software applications including the validated virtual appliance;
building the second software system by combining said second set of software applications including the validated virtual appliance; and
validating said second software system by validating said second set of software applications including the validated virtual appliance, using previously developed knowledge of components of first set of software applications in the validated virtual appliance;
wherein said software validated by validating said virtual appliance is subject to regulatory review and approval.

10. The method for constructing and validating a software system for a data intensive activity of claim 9, wherein the regulatory review and approval comprises food and drug administration (FDA) review and approval.

11. The method for constructing and validating a software system for a data intensive activity of claim 9, wherein the regulatory review and approval comprises review and approval for field trials.

12. The method for constructing and validating a software system for a data intensive activity of claim 9, wherein the regulatory review and approval comprises review and approval for biomedical data gathering.

13. The method for constructing and validating a software system for a data intensive activity of claim 9, including providing a final validation report based on the validating said software system by validating said virtual appliance, wherein the validation includes confirmation by examination and provision of objective evidence that the user requirements specification conforms to user needs and intended uses, and that requirements implemented by the software can be consistently fulfilled.

14. A computer system comprising a validated software system for a data intensive activity, the validated software system including:
hardware;
a second software system that includes a first software system; and
a validated virtual appliance associated with the hardware the validated virtual appliance comprising software applications and virtual appliance support software;
wherein the validated virtual appliance is built by:
creating a user requirements specification for a first software system;
developing a project specific validation plan for the first software based on the user requirements specification;
developing a functional specification based on the user requirements specification;
selecting software applications to carry out the functional specification and selecting virtual machine support software to run the selected software applications;
building the first software system by combining said software applications and said virtual appliance support software to form the virtual appliance;
validating said first software system by validating said virtual appliance;
wherein the validating said software system by validating said virtual appliance comprises confirmation by examination and provision of objective evidence that the user requirements specification conforms to user needs and intended uses, and that requirements implemented by the software can be consistently fulfilled;
creating a second user requirements specification for a second software system;
developing a second project specific validation plan for the second software system based on the second user requirements specification;
selecting a second set of software applications including the first set of software applications including the validated virtual appliance;
building the second software system by combining said second set of software applications including the validated virtual appliance; and
validating said second software system by validating said second set of software applications including the validated virtual appliance, using previously developed knowledge of components of first set of software applications in the validated virtual appliance.

15. The computer system of claim 14, wherein said first software system is designed to operate under known operating system software, and said validating step includes verification of the virtual appliance under the known operating system software.

16. The computer system of claim 15, wherein the validated virtual appliance is further built by bypassing installation validation of the software system through use of validated virtual appliance installation in the known operating system software.

17. The computer system of claim 14, wherein the said software validated by validating said virtual appliance is subject to regulatory review and approval.

18. The method of claim 17 wherein the regulatory review and approval comprises Food and Drug Administration (FDA) review and approval.

* * * * *